US009696784B2

(12) United States Patent
Sadowski et al.

(10) Patent No.: US 9,696,784 B2
(45) Date of Patent: Jul. 4, 2017

(54) DIRECT HARDWARE ACCESS MEDIA PLAYER

(75) Inventors: Greg Sadowski, Cambridge, MA (US); Gabor Sines, Toronto (CA)

(73) Assignees: Advanced Micro Devices, Inc., Sunnyvale, CA (US); ATI Technologies ULC, Markham, ON (CA)

( * ) Notice: Subject to any disclaimer, the term of this patent is extended or adjusted under 35 U.S.C. 154(b) by 752 days.

(21) Appl. No.: 13/620,389

(22) Filed: Sep. 14, 2012

(65) Prior Publication Data

US 2014/0082389 A1    Mar. 20, 2014

(51) Int. Cl.
*G06F 1/32*    (2006.01)

(52) U.S. Cl.
CPC .......... *G06F 1/3234* (2013.01); *G06F 1/3206* (2013.01); *G06F 1/3287* (2013.01); *Y02B 60/1282* (2013.01)

(58) Field of Classification Search
None
See application file for complete search history.

(56) References Cited

U.S. PATENT DOCUMENTS

| 7,360,045 | B2* | 4/2008 | Maezawa | 711/162 |
| 7,966,458 | B2* | 6/2011 | Warrier et al. | 711/152 |
| 2001/0007576 | A1* | 7/2001 | Lyu | 375/240.25 |
| 2004/0006690 | A1* | 1/2004 | Du et al. | 713/2 |
| 2006/0095800 | A1* | 5/2006 | Iwamoto | 713/300 |
| 2011/0050713 | A1* | 3/2011 | McCrary et al. | 345/522 |

* cited by examiner

*Primary Examiner* — Kim Huynh
*Assistant Examiner* — Paul J Yen
(74) *Attorney, Agent, or Firm* — Volpe and Koenig, P.C.

(57) ABSTRACT

A system, method and a computer program product for processing media content on a media player having direct access to hardware are provided in exemplary embodiments. When the media player is initialized, an operating system is placed into a stand-by mode that decreases power consumption on an electronic device. Instead of the operating system, a hardware pipeline processes media content. A hardware pipeline is dedicated to process a media content based on the media content type. The media content is processed using the dedicated hardware pipeline to reduce the power consumption during processing.

21 Claims, 5 Drawing Sheets

DIRECT HARDWARE ACCESS MEDIA PLAYER

BACKGROUND OF THE INVENTION

Field of the Invention

The claimed invention is generally directed to a media player operating on an electronic device. More particularly, the claimed invention is directed to a media player that has direct access to the hardware of the electronic device.

Background Art

Media players that process media content on electronic devices are not power efficient. Power inefficiencies associated with a conventional media player arise from the media player using several layers of software, which are often provided by different vendors, to parse, copy, route, decode and process media content. For example, a conventional media player includes a hardware/software media content pipeline that includes a central processing unit (CPU) and a graphics processing unit (GPU). When the media player uses the CPU, the media player uses software modules that program the CPU. Those software modules allocate memory caches and other system elements available to those software modules, regardless of the type of media content that the media player processes. These allocated memory caches are not utilized when the media player processes certain types of media content. This needless allocation of memory caches and other system resources is unnecessary and wastes power.

Power consumption on a hardware circuit is lower than the power consumption of programmable processors, such as a CPU. Although power consumption features are available in the hardware circuitry, they may or may not be utilized by the conventional media player. For example, when the media player and the corresponding software are provided by the third party vendors, the third party vendors fail to leverage the power consumption circuitry available in the hardware of the electronic device, because they cannot access or program the hardware circuit. Moreover, the conventional operating systems that execute on the electronic devices fail to provide the media player with the power consumption features that are available in hardware because the conventional operating systems do not support or have access to the power consumption features.

With the onslaught of electronic devices that process media content in the market place, power consumption plays a pivotal role in the popularity of a given electronic device. Electronic devices that are power efficient reduce the energy cost to the users and hassle of frequently recharging or running out of battery power. Moreover, power efficient portable electronic devices prolong the battery life of the electronic device, increasing the device's usefulness.

Therefore, what are needed are systems and methods where a media player has direct access to the hardware on an electronic device to increase power efficiency and reduce power consumption.

BRIEF SUMMARY OF EMBODIMENTS OF THE INVENTION

A system, method and a computer program product for processing media content on a media player having direct access to hardware are provided in various exemplary embodiments. When the media player is initialized in an exemplary embodiment, an operating, system is placed into a stand-by mode that decreases power consumption on an electronic device. Instead of the operating system, a hardware pipeline processes media content. A hardware pipeline is dedicated to process a media content based on the media content type. The media content is processed using the dedicated hardware pipeline to reduce the power consumption during processing.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the invention and, together with the description, further serve to explain the principles of the invention and to enable a person skilled in the pertinent art to make and use the invention. Various embodiments of the invention are described below with reference to the drawings, wherein like reference numerals are used to refer to like elements throughout.

The present invention will be described with reference to the accompanying drawings. Generally, the drawing in which an element first appears is typically indicated by the leftmost digit(s) in the corresponding reference number.

DETAILED DESCRIPTION OF EMBODIMENTS OF THE INVENTION

The following detailed description of the invention refers to the accompanying drawings that illustrate exemplary embodiments consistent with this invention. Other embodiments are possible, and modifications can be made to the embodiments within the spirit and scope of the invention. Therefore, the detailed description, is not meant to limit the invention. Rather, the scope of the invention is defined by the appended claims.

It would be apparent to one of skill in the art that aspects of the invention, as described below, can be implemented in many different embodiments of software, hardware, firmware, and/or the entities illustrated in the figures. Any actual software code with the specialized control of hardware to implement the invention is not limiting of the invention. Thus, the operational behavior of the invention will be described with the understanding that modifications and variations of the embodiments are possible, given the level of detail presented herein.

Figure 1:
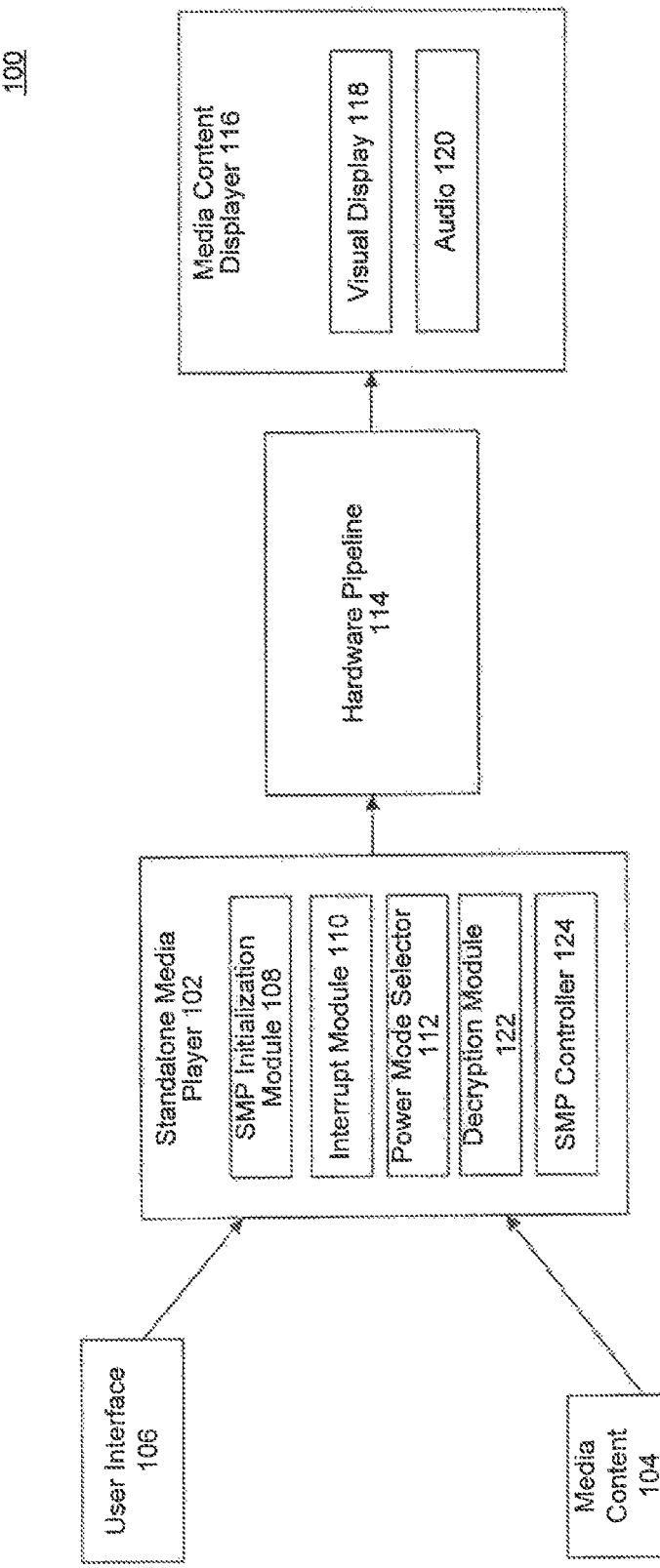
FIG. 1 is a block diagram of an electronic device that includes a standalone media player, according to an embodiment.

FIG. 1 is a block diagram 100 of an electrode device that includes a standalone media player, according to an embodiment. Block diagram 100 includes a standalone media player 102 (also referred to as SMP 102). SMP 102 processes media content 104. However, unlike conventional media players that use a combination of software and hardware to parse, process and display media content, SMP 102 has direct access to computer hardware that process media content 104.

Media content 104 includes video, audio, photographic or other type of content provided to a user using the electronic device. Media content 104 may be downloaded to the electronic device over a network, such as a local area network (LAN), a wide area network (WAN) that includes the Internet, etc. Media content 104 may also be accessed by the electronic device through removable storage devices, such as a compact disk, a thumb drive, a floppy disk, a flash memory, etc. Media content 104 may also be stored in a volatile or non-volatile memory of the electronic device. Example non-volatile memory includes a disk drive, a flash memory and like devices that may store computer program instructions and data on computer-readable media, and maintains the memory state with or without power to the electronic device. Example volatile memory includes RAM or DRAM memory, cache memory, etc., that may store computer program instructions and data on the computer-readable media and requires power to maintain the memory state on the electronic device.

In an embodiment, media content 104 may be stored in a media content file in a compressed or uncompressed form. In another embodiment, media content 104 may be streaming over a local network or over the Internet.

A user interface 106 is an interface by which a user using the electronic device communicates with SMP 102, in accordance with an embodiment of the invention. User interface 106 allows a user to select media content 104 for viewing. For example, a user may use user interface 106 to retrieve media content 104 stored in the volatile or non-volatile memory on the electronic device or elsewhere on the network. User interface 106 also includes options for controlling the processing and display of media content 104. Example options may include play, pause and stop. In another embodiment, user interface 106 may also display the amount of time the media content 104 has been playing, the length of media content 104 and an audio interface.

SMP 102 may be downloaded to the electronic device over a network, stored on the electronic device, or transferred to the electronic device from a removable memory device, such as, for example, a compact disk or a thumb drive discussed above. Once on the electronic device, a user or another application may activate SMP 102 to process media content 104. In another embodiment, SMP 102 may be activated at a BIOS (basic input/output system) level, for example, when the electronic device is started.

As discussed above, SMP 102 is a media player that has direct access to computer hardware on the electronic device. This allows SMP 102 to process media content 104 without, or with a minimal use of, an operating system of the electronic device. This feature is not available in conventional media players. A person skilled in the art will appreciate that an operating system of an electronic device is a software application that manages software and hardware resources on the electronic device, and provides common services to software applications, such as a conventional media player, that execute on the electronic device. For example, typical software applications require an operating system to interface with the computer hardware, to allocate memory and manage resources available to the software application on the electronic device. When typical software applications execute on the electronic device, they make system calls for resources to the operating system that manages resource allocation and processor scheduling. The software applications are also interrupted by the operating system when the system call or a request by the software application completes execution.

SMP 102 includes an SMP initialization module 108. SMP initialization module 108 executes when SMP 102 is activated. SMP 102 may be activated by a user or by another application on the electronic device. For example, a user may select an icon associated with SMP 102 from the display screen of the electronic device to activate SMP 102, orally activate SMP 102, or use the command prompt to activate SMP 102.

In an embodiment, SMP initialization module 108 causes the operating system to determine that SMP 102 is idle. Once the operating system determines that SMP 102 is idle, the operating system enters a stand-by mode. Once the operating system is in a stand-by mode, SMP initialization module 108 stores the state of the operating system and electronic device hardware (such as, CPU registers, memory caches, etc.) in the non-volatile system memory.

Additionally, SMP initialization module 108 also power-gates the CPU and causes the CPU to enter a low power mode. A person skilled in the art will appreciate that a CPU includes one or more control processors for executing processing logic, memory allocation, etc., requested by the operating system and other applications that execute on the electronic device. A person skilled in the art may appreciate that a power-gated mode may be achieved using PMOS and NMOS transistors and CMOS switches that switch between an active mode that requires a lot power and a low power mode, that requires little to no power.

When the operating system is in a stand-by mode, SMP 102 processes and renders media content 104 using a computer hardware pipeline 114, described below. Because the operating system is in a stand-by mode, SMP 102 processes media content 104 without unnecessary power consumption caused by the operating system. Example unnecessary power consumption is associated with a needless resource allocation by the operating system. For example, when an operating system invokes or is invoked by a software application performing a dedicated task (such as media content decoding in a conventional media player), the operating system uses the CPU to allocate resources for the dedicated task and then proceeds to control those resources. However, many of those allocated resources are not necessary to process a particular type of media content and their control and allocation unnecessarily wastes power.

Another example of unnecessary power consumption is caused by multiple software modules executing on a CPU to process media content for a conventional media player. The conventional media players typically decompresses and decodes media content using multiple processors that include, for example, a CPU or a combination of a CPU and a GPU. Conventionally, the CPU decodes media content and distributes the media content for processing to multiple GPUs. The distribution occurs using various software components and memory transfers. Those transfers include copying of the media content from the memory associated with the CPU to the memory associated with one or more GPUs. SMP 102 reduces the needless power consumption caused by multiple memory transfers in the CPU/GPU type processing by using a dedicated hardware pipeline 114 to process media content 104. The hardware pipeline 114 accesses memory that SMP 102 uses to store media content 104 to process media content 104 on a GPU, and thus eliminating multiple needless memory transfers.

A person skilled in the art will appreciate that a GPU is a specialized processor that executes instructions and programs, selected for complex graphics and mathematical operations, in parallel. Example graphics operations may include pixel operations, geometric computations and the rendering of media content 104 to a display screen.

Another example of unnecessary power consumption is caused by a frame-by-frame processing of the media content on a conventional media player. For example, conventional media players typically use a CPU to decode one frame of media content at a time. After each frame is decoded, the frame is transferred to a GPU for processing. Unlike conventional media players, SMP 102 conserves power by decoding multiple media frames at a time in hardware pipeline 114. For example, the hardware decoder included in hardware pipeline 114 may decode as many media frames as the number of frames that can be supported by the size of the memory buffer or provided to the memory buffer by SMP 102.

It an embodiment, SMP initialization module 108 also allocates memory buffers and initializes hardware blocks in hardware pipeline 114 for processing media content 104. For example, memory buffers are required to decode media content 104 and to manipulate media content 104 for display on the electronic device.

Once the operating system is in a stand-by mode, SMP 102 processes media content 104 in a low power mode. Power mode selector 112 determines the power mode for SMP 102 to process media content. In an embodiment, power mode selector 112 selects the power mode based on the type of media content 104. For example, when a user selects media content 104 for processing, power mode selector 104 identifies the type of media content 104. Example types of media content 104 may include video, audio, and images (such as photographic images or a slide show). Each of those types of media content requires processing using different components in hardware pipeline 114. In this way, SMP 102 process media content 104 using the lowest power mode that is required for processing the particular type of media content 104.

Once SMP 102 begins to process media content 104, SMP 102 retrieves media content 104 from a media content file, volatile or non-volatile memory storage, etc. Once retrieved, SMP 102 passes the media content to hardware pipeline 114. Hardware pipeline 114 includes hardware components of an electronic device and hardware circuitry that is dedicated to process media content 104 of a particular type. Example components included in the hardware pipeline include a GPU, a memory associated with the GPU, a compute unit, a command processor and other components included in the electronic device that process media content 104. Moreover, hardware pipeline 114 may have dedicated registers, memory storage, and circuitry that is optimized to processing media content 104 of a particular type.

The memory associated with the GPU is a local/GPO memory. The GPU memory stores media content 104 while it is decoded, manipulated and processed by the GPU, as well as the instructions that process the media content.

A command processor controls media content 104 processing on the GPU. It retrieves instructions that are dedicated to processing a particular media content 104 type from the command buffers in system memory and coordinates the execution of those instructions on the GPU. The command processor may then store the instructions in the GPU memory from which they are fetched by the GPU to process media content 104.

In an embodiment, SMP 102 retrieves encrypted media content 104. For example, media content 104 may be encrypted by the owner or distributor of media content 104 to control or limit the number of users who are able to view media content 104. When media content 104 is encrypted, SMP 102 uses a decryption module 122 to decrypt media content 104 prior to passing the decrypted media content to the hardware pipeline 114.

When hardware pipeline 114 completes processing media content 104, the processed media content 104 is provided to the user using electronic device. In an embodiment, media content displayer 116 provides the processed media content 104 to the user. Media content displayer 116 includes a visual display 118, speakers 120, or other types of devices that are configured to provide processed media content 104 to the user. In an embodiment, media content displayer 116 may be included in the electronic device or otherwise connected to the electronic device using a communication network. When media content displayer 116 is included on electronic device, hardware pipeline 114 may provide processed media content 104 directly to media content displayer 116. In an embodiment, when media content display is communicatively coupled to the electronic device, SMP 102 may issue an interrupt to the operating system to provide the processed media content 104 to media content displayer 116.

In an embodiment, SMP 102 includes an interrupt module 110. Interrupt module 110 allows SMP 102 to restore the operating system state on the electronic device. In an embodiment, SMP 102 may receive an event, such as a user interrupt that occurs when a user pauses media content processing using user interface 106. The interrupt indicates that the electronic device requires a service provided by an operating system on the electronic device. In another embodiment, SMP 102 may complete the processing of media content 104, and uses interrupt module 110 to restore the state of the operating system to the electronic device.

When SMP 102 receives an interrupt, interrupt module 110 restores the state of the operating system, CPU registers, memory caches, and other components of the electronic device from the non-volatile memory.

In an embodiment, SMP 102 includes an SMP controller 124. SMP controller 124 allows SMP 102 to execute on the electronic device without being started by the operating system. For example, SMP initialization module 108 may start SMP 102 by a memory write to an SMP-designated register in a non-volatile memory. In an embodiment, SMP initialization module 108 may perform a memory write at a BIOS level. This allows SMP 102 to execute prior to an operating system being executed or booted up on the electronic device. When SMP 102 executes prior to the operating system being booted up or executing on the electronic device, SMP controller 124 processes various interrupts that are provided by interrupt module 110. For example, SMP controller 124 is able to stop and start media content 104 processing or retrieve media content file from a system memory. Moreover, SMP 102 does not need to place the operating system in a stand-by mode as described above. Once initialized, SMP initialization module 108 proceeds with allocating memory buffers and initializing hardware blocks in hardware pipeline 114 for processing media content 104.

Figure 2:
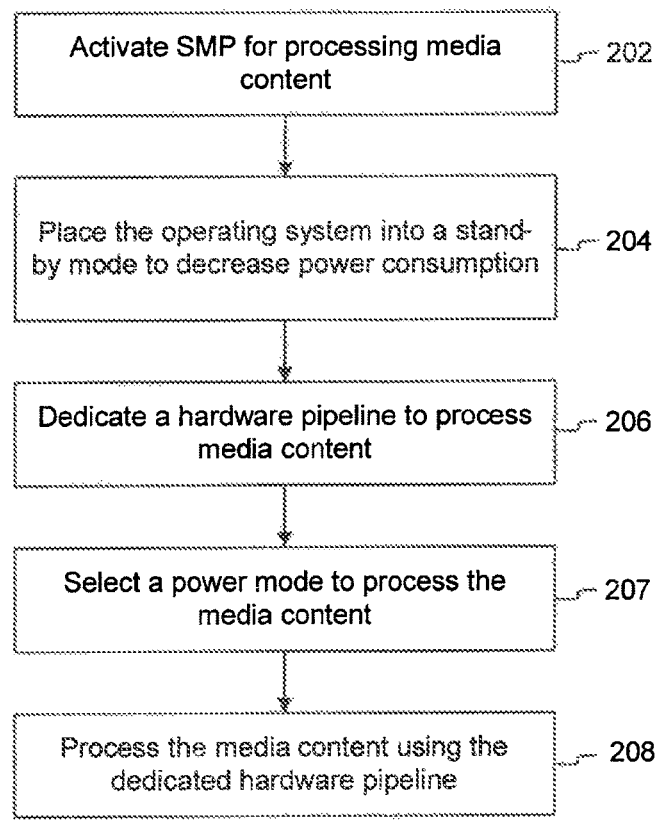
FIG. 2 is a flowchart of a technique for processing media content using a standalone media player, according to an embodiment.

FIG. 2 is a flowchart 200 of a method for processing media content using a standalone media player, according to an embodiment.

At operation 202, an SMP is activated. For example, a user may activate SMP 102 by clicking on an SMP icon on a display screen of the electronic device, selecting media content 104 that requires processing, voice-activating SMP 102, etc. In another embodiment, SMP 102 may be activated by SMP initialization module 108 on the electronic device by writing to a particular memory register in the non-volatile memory.

Figure 3:
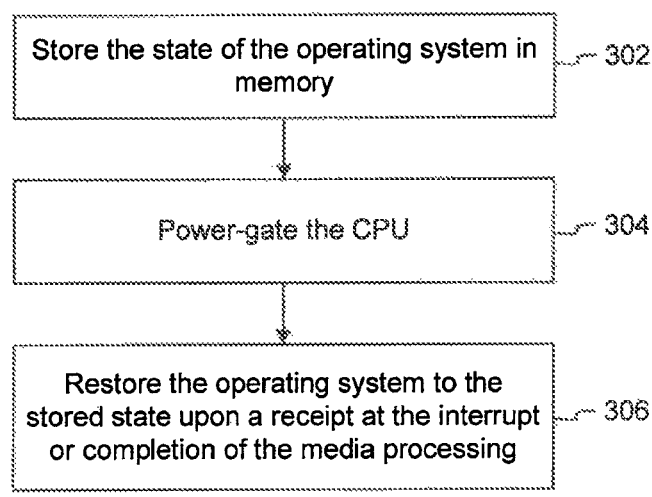
FIG. 3 is a flowchart for restricting access to an operating system during processing of the media content, according to an embodiment.

At operation 204, access to the operating system is placed in a stand-by mode. For example, SMP 102 allows the operating system to determine that SMP 102 is idle, which causes the operating system to enter into a stand-by mode. Once the operating system is in a stand-by mode, SMP initialization module 108 stores the state of the memory registers associated with the operating system and power-gates the CPU to reduce power consumption while SMP 102 processes media content 104 using hardware pipeline 114. FIG. 3 is a flowchart 300 that describes operation 204.

At operation 206, a hardware pipeline is dedicated to process a particular type of media content. For example, SMP initialization module 108 allocates memory in hardware pipeline 114 that stores media content 104 during processing. The allocated memory may include GPU memory or system memory, in an embodiment. SMP initialization module 108 initializes the state and registers of a hardware block in hardware pipeline 114 for processing media content 104. SMP 102 then passes media content 104 for processing to the components in hardware pipeline 114 that are associated with processing a particular type of media content 104.

Figure 4:
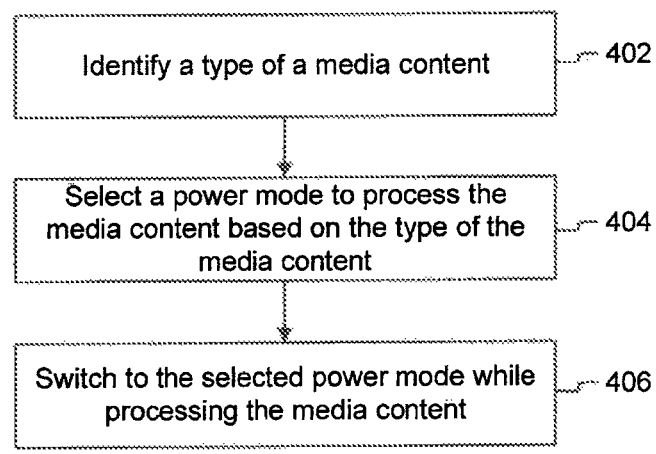
FIG. 4 is a flowchart for selecting a power mode for an electronic device during the processing of the media content, according to an embodiment.

At operation 207, a power mode for processing a media content of a particular type is selected. FIG. 4 is a flowchart 400 that describes operation 207 in detail.

At operation 208, media content is processed. For example, SMP 102 uses the dedicated hardware pipeline 114 to process media content 104.

FIG. 3 is a flowchart 300 of a method for placing an operating system into a stand-by mode during processing of the media content, according to an embodiment.

At operation 302, the state of the operating system is stored. For example, SMP initialization module 108 stores the state of the operating system and corresponding registers in the system memory. Once stored, the operating system enters a stand-by mode which may be reinstated as described in operation 310, below. Operation 306 may be bypassed if/when SMP 102 is initialized without the operating system.

At operation 304, the CPU is power-gated. For example, SMP initialization module 108 power-gates the CPU so that the CPU enters a low power consumption mode. Once CPU enters the low power consumption mode, SMP 102 begins to process media content 104, as described above.

At operation 306, the operating system is restored to the electronic device. Operation 310 can occur upon SMP 102 completing the processing of media content 104, or upon an interrupt event. As described above, the interrupt can be generated by a user using user interface 106 selecting a "pause" or "stop" feature. Operation 310 may also be bypassed when SMP 102 is initialized without the operating system. In this embodiment, SMP controller 124 processes interrupts generated by SMP 102 when media content 104 is processed.

FIG. 4 is a flowchart 400 for selecting a power mode for an electronic device during the processing of the media content, according to an embodiment.

At operation 402, a type of media content is identified. For example, as described herein, media content 104 may include video, audio, photographic images, etc. The type of media content may be identified by a format in which the media content is presented to or stored on the electronic device.

At operation 404, a power mode is selected based on the type of the media content. For example, power mode selector 112 selects the power mode based on the media content type. As described herein, the selected power mode is the lowest power mode necessary to process media content 104 having a particular type. The power mode may be selected because the type of the media content determines the hardware in hardware pipeline 114 that is necessary to process the content, as well as the amount of memory that requires allocation for processing a particular type of media content 104.

At operation 406, the power in the electronic device is switched to the selected power mode for processing the media content. After the switch, SMP 102 processed media content 104 as described herein.

Figure 5:
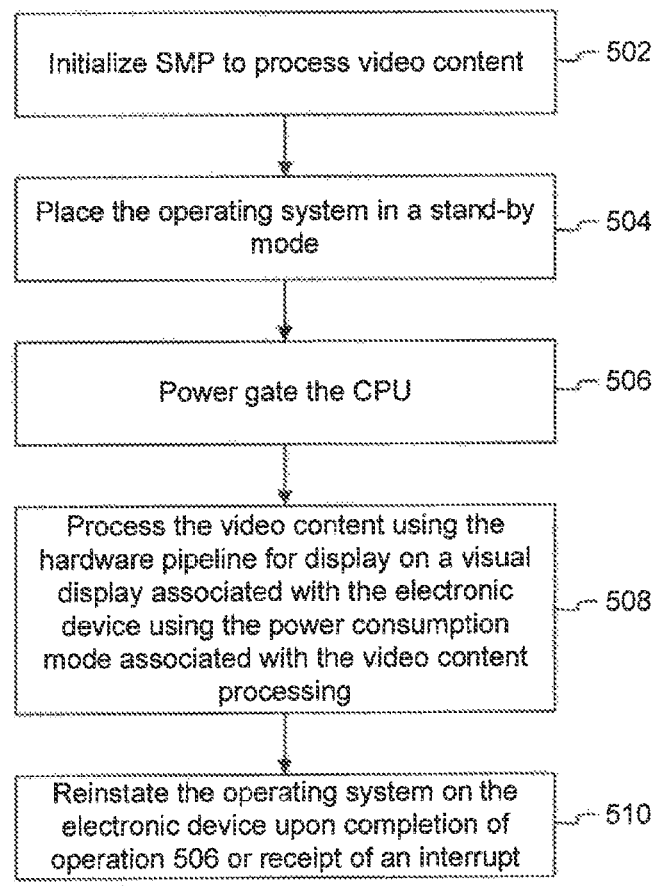
FIG. 5 is a flowchart of a technique for processing video content using a standalone media player, according to an embodiment.

FIG. 5 is a flowchart 500 of a method for processing video content using a standalone media player, according to an embodiment.

At operation 502, an SMP is initialized. When SMP 102 is initialized, SMP 102 allocates memory buffers needed to process video content.

At operation 504, operating system is placed in a stand-by mode. For example, SMP 102 causes the operating system to determine that SMP 102 is idle, so that it enters a stand-by mode. SMP 102 then copies the state of the operating system, CPU registers, etc., into a non-volatile memory storage so that the state of the operating system may be retrieved at some point in the future. As described above, placing the operating system into a stand-by mode reduces the power consumption required to execute the operating system and other applications on the electronic device.

At operation 506, the CPU is power-gated. Once the operating system enters a stand-by mode, the CPU is power-gated to minimize power consumption.

At operation 508, video content is processed. For example, a user using user interface 106 selects a video tile for processing. SMP 102 accesses the selected video file and parses the video content. If the video content is encrypted, decryption module 122 decrypts the encrypted video content. The parsed video contented is then stored in the GPU memory in hardware pipeline 114. The video content is then processed within hardware pipeline 114 using the power consumption mode that is associated with the video content processing. For example, video content is decoded multiple frames at a time, converted from the YUV to the RGB formatted, and is formatted to fit the visual display 118 on or associated with the electronic device. Operation 506 completes when the entire video content is processed or when SMP 102 receives an interrupt event that requires processing by the operating system.

At operation 510, the operating system is reinstated on the electronic device. When video content processing completes or when SMP 102 receives an interrupt, SMP 102 reinstates the operating system to the electronic device. For example, SMP 102 retrieves the state of the operating system from the non-volatile system memory and loads the state in the memory and registers associated with the operating system processing. SMP 102 also un-gates the CPU and reinstates the state of the CPU prior to being power-gated. SMP 102 also resumes the operating system on the electronic device.

A person skilled in the art may further appreciate that the flowchart 500 may be implemented by SMP 102 that may be initialized without the operating system. In this embodiment, operating system is not placed in a stand-by mode and the interrupts generated by SMP 102 are processed using SMP controller 124.

In this document, the terms "computer program medium" and "computer-usable medium" are used to generally refer to media such as a removable storage unit or a hard disk drive. Computer program medium and computer-usable medium can also refer to memories, such as system memory or any other memories available on the electronic device. These computer program products are means for providing software to the electronic device.

The invention is also directed to computer program products comprising software stored on any computer-usable medium. Such software, when executed in one or more data processing devices, causes a data processing device(s) to operate as described herein or, as noted above, allows for the synthesis and/or manufacture of computing devices (e.g., ASICs, or processors) to perform embodiments of the present invention described herein. Embodiments of the invention employ any computer-usable or -readable medium, known now or in the future. Examples of computer-usable mediums include, but are not limited to, primary storage devices (e.g., any type of random access memory), secondary storage devices (e.g., hard drives, floppy disks. CD ROMS, ZIP disks, tapes, magnetic storage devices, optical storage devices, MEMS, nanotechnological storage devices, etc.), and communication mediums (e.g., wired and wireless communications networks, local area networks, wide area networks, intranets, etc.).

While various embodiments of the present invention have been described above, it should be understood that they have been presented by way of example only, and not limitation. It will be understood by those skilled in the relevant art that various changes in form and details can be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method for use in an electronic device, comprising:
   activating an operating system on the electronic device in a normal mode using a central processing unit (CPU) and a graphics processing unit (GPU);
   activating a standalone media player (SMP) to process media content in response to selecting media content for playback, wherein the SMP is electronically activated and the SMP is software that has direct access to computer hardware on the electronic device;
   placing the activated operating system on the electronic device into a stand-by mode in response to activating the SMP, wherein the SMP causes the operating system to be placed in the stand-by mode;
   dedicating, by the SMP, a hardware pipeline of the electronic device to process media content, wherein the hardware pipeline of the electronic device is powered on and accessible when the operating system on the device is in the normal mode or the stand-by mode, wherein the dedicating further includes the SMP initializing the hardware pipeline of the electronic device for processing the media content;
   wherein the dedicating further comprises: allocating a memory buffer in the hardware pipeline for storing the media content during processing; and initializing hardware blocks and registers in the hardware pipeline for processing the media content;
   processing, by the SMP, the media content on the GPU using the dedicated hardware pipeline while the operating system is in the stand-by mode; and
   in response to determining that the hardware pipeline completed processing the media content and that the operating system is in the stand-by mode, restoring the operating system on the electronic device.

2. The method of claim 1, further comprising: initializing the hardware blocks at a BIOS level to bypass the operating system.

3. The method of claim 1, wherein the processor further comprises: concurrently decoding multiple frames of the media content using the dedicated hardware pipeline, wherein a number of multiple frames decoded concurrently is bound by a size of a memory buffer.

4. The method of claim 1, wherein placing the operating system into the stand-by mode further comprises: storing a state of the operating system in a non-volatile disk memory until the processing is complete.

5. The method of claim 4, further comprising reinstating the operating system, wherein the reinstating further comprises: generating an interrupt that requires processing by the operating system; and restoring the state of the operating system from the non-volatile disk memory to process the interrupt.

6. The method of claim 1, further comprising: controlling the power consumption based on a type of the media content to reduce the power consumption during the processing of the media content.

7. The method of claim 1, further comprising: identifying a type of the media content; based on the type of the media content, selecting a power mode to process the media using the hardware pipeline; and processing the media content using the selected power mode.

8. An electronic device comprising:
   an operating system on the electronic device activated in a normal mode using a central processing unit (CPU) and a graphics processing unit (GPU);
   a standalone media player (SMP) activated to process media content in response to selecting media content for playback, wherein the SMP is electronically activated and the SMP is software that has direct access to computer hardware on the electronic device, the SMP configured to:
   place the activated operating system on the electronic device into a stand-by mode in response to activating the SMP; wherein the SMP causes the operating system to be placed in the stand-by mode;
   dedicate a hardware pipeline of the electronic device to processes media content, wherein the hardware pipeline of the electronic device is powered on and accessible when the operating system on the device is in the normal mode or the stand-by mode;
   wherein the dedicating further comprises: allocating a memory buffer in the hardware pipeline for storing the media content during processing; and initializing hardware blocks and registers in the hardware pipeline for processing the media content;
   initialize the hardware pipeline of the electronic device for processing the media content;
   process the media content on the GPU using the dedicated hardware pipeline while the operating system is in the standby mode; and in response to determining that the hardware pipeline completed processing the media content and that the operating system is in the stand-by mode, restore the operating system on the electronic device.

9. The device of claim 8, wherein the SMP further comprises an SMP initialization module, wherein the SMP initialization module is further configured to: initialize the hardware blocks at a BIOS level to bypass the operating system.

10. The device of claim 8, wherein the SMP is further configured to concurrently decode multiple frames of the media content using the dedicated hardware pipeline, wherein a number of multiple frames decoded concurrently is bound by a size of a memory buffer.

11. The device of claim 8, wherein SMP initialization module is further configured to: store a state of the operating system in a non-volatile disk memory until the processing is complete.

12. The device of claim 11, wherein the SMP further comprising an SMP interrupt module, wherein the SMP interrupt module is further configured to: generate an interrupt that requires processing by the operating system; and restore the state of the operating system from the non-volatile disk memory to process the interrupt to reinstate the operating system on the electronic device.

13. The device of claim 8, wherein the SMP further comprising a power mode selector, wherein the power mode selector is further configured to: control the power consumption based on a type of the media content to reduce the power consumption during the processing of the media content.

14. The device of claim 13, wherein the SMP further comprises a power selector, and wherein the power selector is configured to: identify a type of the media content; based on the type of the media content, select a power mode to process the media using the hardware pipeline; and process the media content using the selected power mode.

15. A non-transitory computer-readable medium having instructions stored thereon, that when executed by the computing device cause the computing device to perform operations, comprising:
activating an operating system on the electronic device in a normal mode using a central processing unit (CPU) and a graphics processing unit (GPU);
activating a standalone media player (SMP) to process media content in response to selecting media content for playback, wherein the SMP is electronically activated and the SMP is software that has direct access to computer hardware on the electronic device;
placing the activated operating system on the electronic device into a stand-by mode in response to activating the SMP, wherein the SMP causes the operating system to be placed in the stand-by mode;
dedicating, by the SMP, a hardware pipeline of the electronic device to process media content, wherein the hardware pipeline of the electronic device is powered on and accessible when the operating system on the device is in the normal mode or the stand-by mode, wherein the dedicating further includes the SMP initializing the hardware pipeline of the electronic device for processing the media content;
wherein the dedicating further comprises: allocating a memory buffer in the hardware pipeline for storing the media content during processing; and initializing hardware blocks and registers in the hardware pipeline for processing the media content;
processing, by the SMP, the media content on the GPU using the dedicated hardware pipeline while the operating system is in the stand-by mode; and
in response to determining that the hardware pipeline completed processing the media content and that the operating system is in the stand-by mode, restoring the operating system on the electronic device.

16. The non-transitory computer-readable medium of claim 15, wherein the operations that place the operating system into the stand-by mode, further include operations comprising: causing the operating system to determine that the media content processing by the operating system is not required when the electronic device receives an indication to process the media content; and causing the operating system to enter a stand-by mode based on the determination that the media content processing is not required.

17. The method of claim 1, further comprising storing a state of the operating system in a non-volatile memory when the operating system is in the stand-by mode; and wherein the restoring further comprises: retrieving the state of the operating system from the non-volatile memory; and executing the operating system using the retrieved state.

18. The method of claim 1, further comprising: receiving an interrupt while the operating system is in the stand-by mode, wherein the interrupt requires processing using the operating system; and restoring the operating system in response to the receiving the interrupt.

19. The device of claim 8, wherein the SMP is further configured to:
restore the operating system on the electronic device when the standalone media player determines that the hardware pipeline completed processing the media content and that the operating system is in the stand-by mode.

20. The device of claim 19, wherein the standalone media player is further configured to: store a state of the operating system in a non-volatile memory when the operating system is in the stand-by mode; and to restore the operating system the standalone media player is further configured to: retrieve the state of the operating system from the non-volatile memory; and cause the electronic device to execute the operating system using the retrieved state.

21. The device of claim 19, further comprising an interrupt module configured to: receive an interrupt while the operating system is in the stand-by mode, wherein the interrupt requires processing using the operating system; and restore the operating system in response to receiving the interrupt.

* * * * *